Figure 1:
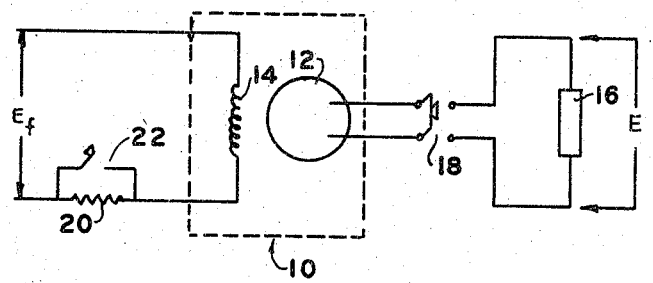

INVENTORS
ALOIS L. JOKL
BY MICHAEL MANDZYN

ATTORNEYS

United States Patent Office 3,324,384
Patented June 6, 1967

3,324,384
GENERATOR WITH FIELD RESISTANCE
SWITCHING
Alois L. Jokl, Dearborn, and Michael Mandzyn, Detroit, Mich., assignors, by mesne assignments, to Rett Electronics, Inc., Warren, Mich., a corporation of Michigan
Filed July 29, 1963, Ser. No. 298,155
3 Claims. (Cl. 322—83)

This invention relates to electric generators, and more particularly to circuitry for use in connection with the field of the generator to limit the transient change in output voltage which occurs upon the addition or removal of a heavy load.

When large loads are applied to or removed from generators the output voltage of the generator undergoes a sudden excursion, decreasing as a load is applied and increasing as a load is removed. This is a particularly troublesome problem when alternating current generators power induction motors which throw heavy transient loads on the system and often trip over-voltage or under-voltage relays. These voltage excursions under transient conditions represent the time required for the field current to adjust to new conditions. Therefore, efforts toward correcting this situation are related to schemes for decreasing the time constant of the field windings and for decreasing the amount of required field current change for a given load change. The first objective may be attained by adding a resistance in series with the field coil. However, this action does not attain the second objective and, in addition it decreases the power handling capability of the unit if it is self-excited or requires a larger excitation system if the field is independently excited.

The present invention therefore contemplates the provision of a fixed resistor and a switching system which connect the resistor in series with the field winding of a generator at conditions of no load and light loads and thereby effectively decrease the time constant of the generator at these loads; and will switch the resistor out of the circuit so as to connect the field winding directly across the power supply at heavier and full load conditions so that a larger generator or exciter will not be required. At the same time, this scheme will decrease the effective transient and synchronus reactances of the generator by reducing the effective demagnetizing current components of these reactances and thus decrease the required swing in field current for a given load change.

While the field current is generally a function of generator load and may be sensed in order to control the switching of the resistance into and out of the field circuit, the removal of a load may best be sensed by the change in generator output voltage. The preferred embodiment of the invention, which will subsequently be described in detail, therefore utilizes a switching circuit wherein a resistor is disposed in series with the field coil as long as the field current remains below a predetermined value and is short-circuited when the current rises above that level. However, when the generator output voltage rises above a normal value, means are provided for preventing the field resistor from being shorted. Thus, the resistor will be in the circuit at the time a load is applied and will remain there until such time as a reasonable load level is achieved so as to decrease the time constant of the generator during that period. When this predetermined load level is achieved, the resistor is short-circuited, decreasing the effective transient and synchronous reactances of the generator. Upon the removal of a load from the generator, the sudden rise in generator output voltage triggers a circuit which opens the short circuit of the resistor and thereby decreases the time constant and the effective reactances of the generator during the load removal transient period.

In the preferred embodiment the switching of the resistance into and out of the field circuit is accomplished with controlled rectifiers. A fixed resistor is disposed in series with the field and in shunted by the anode-cathode path of a controlled rectifier. The gate of the rectifier senses the voltage across a portion of the resistor, which voltage is a function of the field current. When this voltage reaches a predetermined value the controlled rectifier fires and thereby short circuits the resistor so that if is effectively removed from the field circuit. A second controlled rectifier has its gate connected to sense the generator output voltage. This second controlled rectifier is connected so that when it fires it drives the anode of the first controlled rectifier below the holding level, thereby extinguishing the first controlled rectifier. Thus, at such time as the generator output voltage increases above a normal level by reason of the removal of a heavy load, the second controlled rectifier fires and extinguishes the first controlled rectifier so as to reinsert the fixed resistor in the field circuit.

It is, therefore, seen to be an object of the invention to provide a generator having a resistor and a switching circuit for placing the resistor in series with the field at no load and low load conditions and removing the resistor from the field circuit at higher load conditions.

A further object is to provide a generator with a fixed resistor which is in a series with the field coils, is shorted out under load conditions and is reinserted at such time as the generator output voltage rises above its normal value.

A still further object is to provide a generator having a fixed resistor in series with the field coils, a controlled rectifier having its anode-cathode path shunting the fixed resistor, a gate circuit for the controlled rectifier operative to fire the gate upon the occurrence of a predetermined field current, and means for preventing the controlled rectifier from firing upon a rise of the generator output voltage above a normal value.

Figure 2:
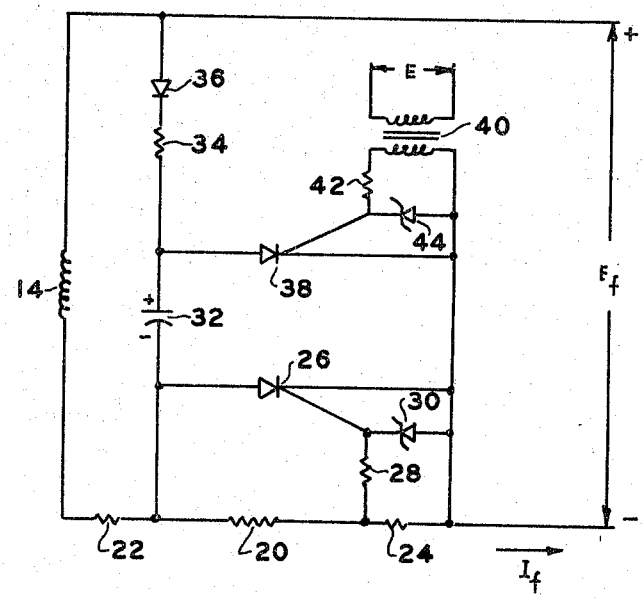

Other objects, advantages and applications of the present invention will be made apparent by the following detailed description of a preferred embodiment of the invention. The description makes reference to the accompanying drawings in which:

FIGURE 1 is a schematic diagram largely in block form, illustrating apparatus embodying the broad teachings of the invention; and FIGURE 2 is a schematic diagram of an electronic circuit for achieving the desired switching action.

Referring to FIGURE 1 a generator, generally indicated at 10, is shown to have an armature 12 and a field winding 14. The generator 10 may be of the direct current or alternating current type. FIGURE 1 illustrates a single-phase generator, although the scheme is applicable to a generator with any number of phases.

The output voltage E of the armature is illustrated as being applied to a load 16 through a double throw switch, or contactor 18.

A voltage $E_f$ is applied across the field winding 14 through a fixed resistor 20. (The voltage $E_f$ may be derived either from the generator windings or from an independent exciter circuit.) The value of the resistor 20 is chosen so as to decrease the time constant of the alternator to a reasonable value at conditions of no load or light load, and so as to decrease the effective generator reactances to reasonable values. The circuit is completed by a single pole switch 22 which shunts the resistor 20 when closed. When the switch 22 is open, resistor 20 is in series with the field. When the switch 22 is closed, the field circuit 14 is connected directly across its supply source.

When the breaker 18 is closed so as to suddenly impose the load 16 on the generator 10, the switch 22 is in open condition so that the resistor 20 is in series with field winding 14. This provides the generator with a low time constant and the field current quickly builds up to load value. As the field increases, the switch 22 is closed so as to shunt the resistor 20 out of the circuit of the field 14. Therefore, at full load the exciter need not provide any greater power than it would if the resistor circuit were not employed. Equally important, the shunting of resistor 20 has decreased the effective reactances of the generator. It would be possible to actuate the switch 22 manually or it might be mechanically connected to the switch 18 so as to close a predetermined time after load application.

FIGURE 2 illustrates an electronic switching system which might replace the switch 22 of FIGURE 1. Again, the field winding 14 is shown to be energized by a variable direct current exciter voltage $E_f$. The field circuit includes the resistor 20, as well as a pair of series fixed resistors 22 and 24 which will normally be of lower value than the resistor 20. The resistor 22 is permanently in the field circuit and lowers the time constant of the generator at full load, as well as at low load conditions. It may or may not be employed in connection with the invention depending upon the particular application.

The resistors 20 and 24 are shunted by a controlled rectifier 26 which has its cathode-anode path connected across the resistors. Thus, when the controlled rectifier 26 is conductive, the resistors 20 and 24 are effectively shunted out of the field coil circuit. The resistors 20 and 24 act as a voltage divider. The voltage of the resistor 24 is applied to the gate of the controlled rectifier 26 through a current limiting resistor 28. The combination of the resistors 24 and 28 is shunted by a Zener-diode 30 which breaks down when the voltage across it reaches a sufficient magnitude to harm the controlled rectifier. The Zener-30 thus provides transient voltage protection to the controlled rectifier 26.

A polarized capacitor 32 has its negative end connected to the anode of the controlled rectifier 26 and is charged to the indicated polarity through a series combination of the resistor 34, the rectifier 36. The rectifier prevents the capacitor 32 from discharging through the resistor 34 and the field winding 14.

A second controlled rectifier 38 has its anode-cathode path connected across the series combination of the capacitor 32 and the controlled rectifier 26. The cathodes of the controlled rectifiers 26 and 38 are joined together. The firing circuit for the controlled rectifiers 38 derives power from a transformer 40 which has its primary connected across the generator so as to experience the output voltage E. The secondary of the transformer 40 connects to the gate of the controlled rectifier 38 through the current limiting resistor 42. A second Zener-diode 44 is connected between the gate and the cathode of the controlled rectifier to protect it from transient surges.

In operation, as the generator starts up and current $I_f$ begins to flow, there is insufficient voltage across the resistor 24 to fire the controlled rectifier 26, and accordingly the resistors 20 and 24, as well as the resistor 22 are in the circuit of the field coil 14. This provides the generator with a low time constant. As the current $I_f$ builds up to a predetermined value, the voltage across the resistor 24 is sufficient to cause the controlled rectifier 26 to fire. The resistors 20 and 24 are, therefore, shorted out of the field circuit, decreasing the effective reactances of the generator and reducing the maximum power required from the exciter.

When a load is suddenly removed from the generator, the output voltage will suddenly rise. This will provide a sufficient voltage to the gate of the controlled rectifier 38 to cause it to fire and thereby discharge the capacitor 32. The constants of the gate circuit for the controlled rectifier 38 are chosen so that it does not fire at normal load values of E.

When the capacitor 32 discharges it drives the anode of the controlled rectifier 26 in the negative direction so as to decrease the current through the controlled rectifier 26 below the holding value and extinguish the controlled rectifier 26. At this point the resistors 20 and 24 are effectively inserted into the field winding circuit and they lower both the time constant of the generator so as to provide rapid response to the load removal transient, and the effective reactances of the generator so as to reduce the field current swing. In the event that an output voltage transient briefly occurs and extinguishes the controlled rectifier 26, the resultant voltage drop across the resistor 24 will immediately cause the controlled rectifier 26 to refire.

By use of this circuitry the generator field circuit may be adjusted so as to provide low time constants and low effective reactances at the occurrence of sudden load insertion or removal and to provide a normal time constant, with the attendant efficient operation, at normal loads.

Having thus described our invention we claim:

1. A control system for a generator having a field coil, comprising: a source of excitation for said field coil; a fixed resistor connected in series with said field coil and said source of excitation; a first controlled rectifier having its anode-cathode path connected across the resistor; a firing circuit connected to said resistor and to the gate of said first controlled rectifier operative to sense the current flowing through said resistor to fire the first controlled rectifier upon the current exceeding a predetermined value; a capacitor having first and second terminals, said first terminal being connected to the anode of said first controlled rectifier; a charging circuit connected in series with the capacitor across the field coil; and second controlled rectifier having its anode connected to the second terminal of the capacitor, and its cathode connected to the cathode of the first controlled rectifier; and a second firing circuit connected to the generator output and to the gate of the second controlled rectifier, operative to fire the second controlled rectifier upon the generator output voltage exceeding a predetermined value, thereby decreasing the anode-cathode voltage across the first controlled rectifier, which prevents said first controlled rectifier from firing even though its gate voltage is otherwise sufficient to cause firing, so that the resistor is maintained in series with said field coil whenever the output voltage of the generator exceeds a predetermined value as well as at such time as the voltage output of the generator is below the predetermined value but the field current is below another predetermined value.

2. The device of claim 1 wherein the firing circuit for the gate of the first controlled rectifier senses the current flowing through said resistor by means of sensing the voltage across a portion of said resistor.

3. The device of claim 1 wherein the charging circuit for the capacitor includes a rectifier which allows the capacitor to normally charge to a voltage sufficient to cause the first controlled rectifier to fire at such time as a sufficient gate voltage is present, and prevents the capacitor from discharging upon current reversal in the field coil.

References Cited

UNITED STATES PATENTS

| | | | |
|---|---|---|---|
| 1,850,734 | 3/1932 | Thorne | 322—83 X |
| 3,024,401 | 3/1962 | Dinger | 307—88.5 |
| 3,089,998 | 5/1963 | Reuther | 307—88.5 |
| 3,184,671 | 5/1965 | Riggs | 318—345 X |
| 3,209,228 | 9/1965 | Gawron | 318—345 |
| 3,210,601 | 10/1965 | Walker | 307—88.5 |
| 3,226,626 | 12/1965 | Moore. | |

MILTON O. HIRSHFIELD, *Primary Examiner.*

MAX L. LEVY, *Examiner.*

J. J. SWARTZ, *Assistant Examiner.*